United States Patent [19]

Goth

[11] 4,252,852

[45] Feb. 24, 1981

[54] AQUEOUS VINYL COATINGS

[75] Inventor: Stephen Goth, Southampton, Pa.

[73] Assignee: Rohm and Haas Company, Philadelphia, Pa.

[21] Appl. No.: 55,882

[22] Filed: Jul. 9, 1979

[51] Int. Cl.$^3$ .................. B32B 27/08; B05D 3/02
[52] U.S. Cl. .................. 428/336; 260/29.6 R; 260/29.6 T; 260/29.7 T; 427/393.5; 428/516; 428/518; 428/520
[58] Field of Search .................. 427/385 B, 393.5; 428/516, 518, 520, 336; 260/29.6 R, 29.6 T, 29.7 T

[56] References Cited

U.S. PATENT DOCUMENTS

| | | | |
|---|---|---|---|
| 3,309,330 | 3/1967 | Settlage | 260/29.6 TA |
| 3,353,992 | 11/1967 | Grenley et al. | 428/520 X |
| 3,362,841 | 1/1968 | Menikheim et al. | 260/29.6 X |
| 3,785,860 | 1/1974 | Zdanowski | 428/520 X |
| 4,058,649 | 11/1977 | Steiner | 428/518 |

*Primary Examiner*—Michael R. Lusignan
*Attorney, Agent, or Firm*—Lester E. Johnson

[57] ABSTRACT

Disclosed is a process for treating and preserving a vinyl film substrate by applying thereto, followed by drying, a coating film of a polymer latex composition and an article produced thereby. The product article is characterized by an advantageous combination or balance of desirable properties including block resistance, surface tack, solvent resistance, plasticizer migration resistance, abrasion resistance, adhesion, and color stability.

22 Claims, No Drawings

AQUEOUS VINYL COATINGS

BACKGROUND OF THE INVENTION

1. Field of the Invention

This invention relates to a process for producing coated vinyl film by treating and preserving a vinyl film substrate by applying thereto a coating film and to coated articles produced thereby. More particularly, the invention relates to aqueous polymer latex compositions adapted for use in coating vinyl film substrates. The coated vinyl film substrates of the invention are adapted for use in producing wall coverings, automotive upholstery, home interior upholstery such as furniture coverings and drapes, shower curtains, tablecloths, luggage, swimming pool linings, and vinyl coatings for hardboard.

There is a need in the art relating to coatings for vinyl substrates, particularly vinyl film substrates as defined herein, for coatings, that is, topcoats, which have an advantageous combination or balance of properties required of coated films having uses as described herein relating to block resistance, surface tack, solvent resistance, plasticizer migration resistance, abrasion resistance, adhesion and color stability. Although organic solvent-based coatings for vinyl film substrates heretofore have been satisfactory, there is a growing concern for developing pollution-free and energy-conserving industrial processes for producing such products as coated vinyl films. Accordingly, there is a need in this art to find a suitable replacement for solvent-based vinyl coating compositions, namely for aqueous vinyl coating compositions, which will reduce pollution of the environment with volatile organic solvents and which will also more effectively utilize energy resources in that the use of organic solvents, which consume substantial amounts of energy in their production, may be directed to such processes in which their use is essential and in that processing of such aqueous coating compositions and articles coated therewith is characterized by the use of mild energy conditions.

Although several polymer latex compositions known in the art have been examined as alternatives to the use of solvent-based coating systems and have been found to afford some improvement in one, or even several, of the properties required of vinyl coating compositions useful in producing coated vinyl film substrates adapted for use in producing articles such as those described herein, these alternative polymer latex compositions have been found to be deficient in other of the required properties such that a practicable alternative to solvent-based coating compositions for vinyl film substrates remains to be provided. Examples of such alternative compositions are those aqueous emulsion addition polymers containing units derived from 3-chloro-2-hydroxypropyl dimethyl methacryloxyethylammonium chloride as disclosed in U.S. Pat. No. 3,678,098, assigned to the same assignee as is the present application; those aqueous emulsion addition polymers containing units derived from allyl o-benzoylbenzoate and allyl 2-(4'-methyl)benzoylbenzoate as disclosed in U.S. Ser. No. 43,998 filed May 31, 1979, both applications being assigned to the same assignee as is the present application; and those containing units derived from the N-methylolamide of acrylic acid as disclosed in U.S. Pat. No. 3,159,562, assigned to the same assignee as is the present application.

DESCRIPTION OF THE PRIOR ART

Zdanowski, U.S. Pat. No. 3,573,239 issued Mar. 30, 1971, discloses in a floor polish composition the use of (A) an aqueous dispersion of a water-insoluble linear copolymer of at least one nitrile of acrylic acid or methacrylic acid and at least one $C_1$-$C_{18}$ alkyl acrylate or $C_5$-$C_{18}$ alkyl methacrylate or (B) a water-insoluble linear copolymer of at least one nitrile of acrylic acid or methacrylic acid, at least one $C_1$-$C_{18}$ alkyl acrylate or methacrylate, at least one of acrylic acid or methacrylic acid or itaconic acid in the form of amine, ammonium or alkali metal salt or at least one monomer containing an amine group and, optionally, at least one other water-insoluble monomer from the group including vinyl acetate, styrene, vinyl toluene, vinyl chloride and vinylidene chloride.

Zdanowski, U.S. Pat. No. 3,808,036 issued Apr. 30, 1974, discloses in a floor polish composition, containing a polyvalent metal compound to form polyvalent metal-containing ions, the use of an aqueous emulsion of an addition polymer of at least one hard monomer selected from the group consisting of an alpha,beta-ethylenically unsaturated nitrile, for example acrylonitrile and methacrylonitrile, and an alkyl ester of an alpha,beta-ethylenically unsaturated carboxylic acid, for example a member of the group of $C_1$-$C_{18}$ alkyl acrylate or methacrylate. Optionally, there may be included in the copolymer one or more monomers selected from the group including vinyl acetate, styrene, vinyl toluene, vinyl chloride, vinylidene chloride, and an alpha,beta-mono-ethylenically unsaturated acid or an amine containing monomer.

Zdanowski and Larsson, U.S. Pat. No. 3,900,438 issued April 19, 1975, discloses a coating composition for polishing floors and furniture containing a linear, water-insoluble polymer containing units having an amine group therein, the balance of the monomer being selected from the group consisting of styrene, vinyl toluene, vinyl acetate, vinyl chloride, vinylidene chloride, acrylonitrile, methacrylonitrile, acrylamide, methacrylamide, and $C_1$-$C_{18}$ esters of acrylic acid and methacrylic acid.

Lester et al., U.S. Pat. No. 4,094,685 issued June 13, 1978, disclose, in an expandable polymeric coating composition, a binder copolymer latex selected from a list of film-forming polymers including, to name but a few, polyethylene, 1,4-polyisoprene, polyacrylonitrile, acrylonitrile-butadiene-styrene terpolymer, polyvinyl acetate, polystyrene, polyurethane, polycarbonates, polyamides, and copolymers of various combinations of monomers including styrene, vinylidene chloride, butyl acrylate, vinyl acetate, acrylonitrile, methyl methacrylate, ethyl acrylate, and 2-ethylhexyl acrylate.

SUMMARY OF THE INVENTION

It is an object of the present invention to provide a process for making a coated vinyl film which overcomes the deficiencies and difficulties heretofore known.

Also, it is another object to provide, as an article of manufacture, a coated vinyl film product produced by the process of the invention.

These and other objects as will become apparent are achieved in the present invention which comprises a process for making coated vinyl film by treating and preserving a vinyl film substrate, having a thickness of from 1 mil to 200 mils and being produced from about 85 to 100 parts by weight of vinyl chloride and from 0 to about 15 parts by weight of at least one member selected from the group consisting of vinylidene chloride, vinyl acetate, alkyl acrylates, alkyl methacrylates, styrene, acrylonitrile, alpha-olefins and diene monomers, which comprises applying to the vinyl film substrate a coating film and then drying the coated vinyl film substrate under mild conditions of about 170° F. to about 300° F., preferably from about 180° F. to about 220° F. for about 0.05 to about 5 min. or more as required by the thickness of the coating film applied and by the solids content therein to obtain a dried film having a thickness of from about 0.05 mil to 1 mil, wherein the coating film comprises a polymeric latex composition having a polymer solids content of about 25% to about 60% by weight and comprises an aqueous emulsion addition polymer polymerized from a monomer mixture consisting essentially of (a) about 10 to 80 parts by weight, based on total monomer mixture, of at least one member selected from the group consisting of (i) $C_4$–$C_8$ alkyl acrylates, (ii) a member of the group of vinyl aromatic monomers consisting of styrene, vinyl toluene, and alpha-methyl styrene, and (iii) $C_4$–$C_8$ alkyl methacrylates, (b) about 15 to about 30 parts by weight, based on total monomer mixture, of at least one nitrile-containing monomer selected from the group consisting of acrylonitrile and methacrylonitrile, and (c) 0 to about 25 parts by weight, based on total monomer mixture, of at least one member selected from the group consisting of $C_1$–$C_3$ and $C_9$–$C_{18}$ alkyl methacrylates, $C_1$–$C_3$ acrylates and $C_9$–$C_{18}$ alkyl acrylates, vinyl chloride, vinylidene chloride, vinyl acetate, alpha-olefins and diene monomers, the monomers being selected to provide a coating film formed therefrom having a $T_g$ of from about 20° C. to about 85° C., preferably about 50° C. to about 75° C., and the ratio of (a):(b) being from about 4:1 to 3:2.

In another aspect, the invention comprises an article of manufacture consisting essentially of (a) a vinyl film substrate having a thickness of 1 mil to 200 mils and being produced from a monomer mixture containing a total of 100 parts by weight comprising from about 85 to 100 parts by weight of vinyl chloride and from 0 to about 15 parts by weight of at least one member selected from the group consisting of vinylidene chloride, vinyl acetate, alkyl acrylates, alkyl methacrylates, styrene, acrylonitrile, alpha-olefins and diene monomers, having adhered to at least one surface thereof (b) a dried coating film having a thickness of from about 0.05 mil to about 1 mil comprising the dried product of a polymeric latex composition comprising an aqueous emulsion addition polymer polymerized from a monomer mixture consisting essentially of (1) about 10 to 80 parts by weight, based on total monomer mixture, of at least one member selected from the group consisting of (i) $C_4$–$C_8$ alkyl acrylates, (ii) a member of the group of vinyl aromatic monomer selected from the group consisting of styrene, vinyltoluene, and alpha-methyl styrene, and (iii) $C_4$–$C_8$ alkyl methacrylates, (2) about 15 to about 30 parts by weight, based on total monomer mixture, of at least one nitrile-containing monomer selected from the group consisting of acrylonitrile and methacrylonitrile, and (3) 0 to about 25 parts by weight, based on total monomer mixture, of at least one member selected from the group consisting of $C_1$–$C_3$ and $C_9$–$C_{18}$ alkyl methacrylates, $C_1$–$C_3$ and $C_9$–$C_{18}$ alkyl acrylates, vinyl chloride, vinylidene chloride, vinyl acetate, alpha-olefins and diene monomers, the monomers being selected to provide a coating film formed therefrom having a $T_g$ of from about 20° C. to about 85° C., preferably about 50° C. to about 75° C. and the ratio of the vinyl aromatic monomer to (1):(2) being from about 4:1 to about 3:2.

In accordance with the present invention, it has unexpectedly and surprisingly been discovered that a polymer latex composition comprising an aqueous emulsion addition copolymer having units derived from a monomer mixture having the relatively narrow and specific limitations on composition as defined herein, when applied as a coating film to a vinyl film substrate, provided to the coated film an uniquely advantageous combination or balance of properties including block resistance, surface tack, solvent resistance, plasticizer migration resistance, abrasion resistance (hardness), adhesion (resistance to delamination) and color stability. The advantageous combination of these properties enables the coated vinyl film substrate of the invention to be adapted for use in producing wall coverings, automotive upholstery, home interior upholstery such as furniture coverings and drapes, shower curtains, tablecloths, luggage, swimming pool linings, and vinyl coatings for hardboard.

The aqueous emulsion copolymer used in the invention, as broadly defined above, is formed by the copolymerization of a mixture of about 10–80 parts by weight of at least one of $C_4$–$C_8$ alkyl acrylates, a member of the group consisting of styrene, vinyl toluene and alpha-methyl styrene, and $C_4$–$C_8$ alkyl methacrylates and about 15 to about 30 parts by weight of at least one of acrylonitrile or methacrylonitrile and, optionally, up to about 25, preferably about 15, parts by weight of one or more monomers selected from the group consisting of $C_1$–$C_3$ and $C_9$–$C_{18}$ alkyl methacrylates, $C_1$–$C_3$ and $C_9$–$C_{18}$ alkyl acrylates, vinyl chloride, vinylidene chloride, vinyl acetate, alpha-olefins and diene monomers, provided that the combination of monomers provides to the coating film formed therefrom a $T_g$ of about 20 C to about 85 C and provided that the ratio of the vinyl aromatic monomer to the nitrile-containing monomer is maintained in the range of from about 4:1 to 3:2.

The $T_g$ value can be found by plotting the modulus of rigidity against temperature; the $T_g$ can be taken as the temperature at which the modulus first falls appreciably below the line established in the glassy region as the temperature rises. A convenient method for determining modulus of rigidity and transition temperature is described by I. Williamson, *British Plastics*, 23, 87–90, 102 (September, 1950). A convenient method of calculating the $T_g$, based upon the $T_g$ of homopolymers of individual monomers, is described by Fox, *Bull. Am. Physics Soc.*, 1, 3, page 123 (1956). Tables of the $T_g$ of the homopolymers are widely available and include the one in "Polymer Handbook" Section III, Part 2, by W. A. Lee and R. A. Rutherford. Monomers may be selected to obtain the appropriate $T_g$ through the use of the "Rohm and Haas Acrylic Glass Temperature Analyzer", publication CM-24 4/76 of Rohm and Haas Company, Philadelphia, Pennsylvania.

Preferably, the aqueous emulsion addition polymer used in the invention is polymerized from a monomer mixture of (a) about 10 to 50 parts by weight, based on total monomer mixture, of at least one $C_4$-$C_8$ alkyl acrylate, (b) about 30 to 70 parts by weight, based on total monomer mixture, of at least one member selected from the group consisting of (i) a member of the group of vinyl aromatic monomers consisting of styrene, vinyl toluene, and alpha-methyl styrene and (ii) $C_4$-$C_8$ alkyl methacrylates, (c) about 15 to 30 parts by weight, based on total monomer mixture, of at least one nitrile-containing monomer selected from the group consisting of acrylonitrile and methacrylonitrile and (d) 0 to about 25 parts by weight, based on total monomer mixture, of at least one member selected from the group consisting of $C_1$-$C_3$ and $C_9$-$C_{18}$ alkyl methacrylates, $C_1$-$C_3$ and $C_9$-$C_{18}$ alkyl acrylates, vinyl chloride, vinylidene chloride, vinyl acetate, alpha-olefins and diene monomers, the monomers being selected to provide a coating film formed therefrom having a $T_g$ of from about 20 C to about 85 C and the ratio of (b):(c) being from about 3:1 to 3:2 as the amount of (a) varies.

More preferably, the aqueous emulsion addition polymer used in the invention is polymerized from a monomer mixture of (a) about 20 to 50 parts by weight, based on total monomer mixture, of at least one $C_4$-$C_8$ alkyl acrylate, (b) about 30 to 50 parts by weight, based on total monomer mixture, of at least one member selected from the group consisting of (i) a member of the group of vinyl aromatic monomers consisting of styrene, vinyl toluene, and alpha-methyl styrene and (ii) $C_4$-$C_8$ alkyl methacrylates, (c) about 15–30 parts by weight, based on total monomer mixture, of at least one nitrile-containing monomer selected from the group consisting of acrylonitrile and methacrylonitrile, and (d) 0 to 15 parts by weight, based on total monomer mixture, of at least one member selected from the group consisting of $C_1$-$C_3$ and $C_9$-$C_{18}$ alkyl methacrylates, $C_1$-$C_3$ and $C_9$-$C_{18}$ alkyl acrylates, vinyl chloride, vinylidene chloride, vinyl acetate, alphaolefins and diene monomers, the monomers being selected to provide a coating film formed therefrom having a $T_g$ of from about 20° C. to about 85° C. and the ratio of (b):(c) being from about 5:2 to 3:2 as the amount of (a) varies.

In a still more preferred embodiment, the aqueous emulsion addition polymer used in the invention is polymerized from a monomer mixture of (a) about 20 to 50 parts by weight, based on total monomer mixture, of at least one $C_4$-$C_8$ alkyl acrylate, (b) about 30 to 50 parts by weight, based on total monomer mixture, of at least one member selected from the group consisting of (i) a member of the group of vinyl aromatic monomers consisting of styrene, vinyl toluene, and alpha-methyl styrene and (ii) $C_4$-$C_8$ akyl methacrylates, and (c) about 15 to 30 parts by weight, based on total monomer mixture, of at least one nitrile-containing monomer selected from the group consisting of acrylonitrile and methacrylonitrile, the monomers being selected to provide a coating film formed therefrom having a $T_g$ of from about 50° C. to about 75° C. and the ratio of (b):(c) being from about 5:2 to 3:2 as the monomer of (a) varies.

Most preferably, the aqueous emulsion addition polymer used in the invention is polymerized from a monomer mixture of (a) about 30 to 50 parts by weight based on total monomer mixture, of at least one $C_4$-$C_8$ alkyl acrylate, (b) about 30 to 50 parts by weight, based on total monomer mixture, of at least one vinyl aromatic monomer selected from the group consisting of styrene, vinyl toluene, and alpha-methyl styrene, and (c) about 15 up to about 30 parts by weight, based on total monomer mixture, of at least one nitrile-containing monomer selected from the group consisting of acrylonitrile and methacrylonitrile, the monomers being selected to provide a coating film formed therefrom having a $T_g$ of from about 50° C. to about 75° C. and the ratio of (b):(c) being from about 5:2 to 2:1 as the amount of (a) varies.

Examples of the $C_4$-$C_8$ alkyl acrylate component include butyl acrylate and any of the other isomeric $C_4$ alkyl acrylates, hexyl acrylate, c-hexyl acrylate, n-octyl acrylate, and 2-ethylhexyl acrylate. This monomer component is selected especially for its properties whereby a combination of suitable hardness for abrasion resistance, suitable balance of hydrophobicity and hydrophilicity, suitable adhesion to the vinyl film substrate and block resistance is provided to the dried coating film and to the product coated vinyl film. Most preferably this monomer component is butyl acrylate.

The vinyl aromatic monomer, which is at least one member selected from the group consisting of styrene, vinyl toluene, and alpha-methyl styrene, is selected especially for its properties whereby a combination of suitable softness for flexibility, suitable hardness for abrasion resistance, suitable balance between hydrophobicity and hydrophilicity, and solvent resistance is provided in the coating film and to the coated film product. Preferably, this monomer component is styrene.

Examples of the $C_4$-$C_8$ alkyl methacrylate component include methacrylates having the same alkyl groups mentioned in regards to the $C_4$-$C_8$ alkyl acrylates above. Most preferably, this monomer component is butyl methacrylate or isobutyl methacrylate, especially isobutyl methacrylate.

The member of the group of acrylonitrile or methacrylonitrile is selected especially for its properties whereby a combination of suitable plasticizer migration resistance and a suitable balance between hydrophobicity and hydrophilicity is provided in the coating film and to the coated film product. Most preferably, this monomer component is acrylonitrile.

Any one or more of the optional monomers may be selected for use with the three essential monomer components in order to modify, or otherwise contribute to, the desired combination of properties in the resulting coated film product provided that the optional monomer selected is compatible with the essential monomer components and that the $T_g$ of the coating film is within the range required as defined above.

As will be seen in the examples which follow, the relatively narrow and specific limitations on composition of the polymeric latex composition in the invention are critical in achieving the advantageous combination or balance of the required properties in the vinyl topcoat, that is the coating film for vinyl film substrates according to the invention, and in the coated vinyl film substrates according to the invention.

If the $C_4$-$C_8$ alkyl acrylate component is present in an amount greater than about 50 parts by weight, the coating film suffers the disadvantage of being too soft; on the other hand, if the amount of the $C_4$–$C_8$ alkyl acrylate component is less than about 20 parts by weight, the coating film suffers the disadvantage of possessing excessive hardness and deficient flexibility for the intended uses. If the vinyl aromatic component is present in an amount greater than about 50 parts by weight, the coating film possesses the advantage of increased solvent resistance, especially alcohol (isopropanol) resistance, however, it is also too tacky for the intended uses; on the other hand, if the vinyl aromatic component is present in an amount less than 30 parts by weight, the resulting coating film possesses suitable tack but also suffers deficient alcohol resistance. A narrow range of $C_4$–$C_8$ alkyl methacrylates may be substituted for the vinyl aromatic monomer. If the nitrile-containing monomer is present in an amount greater than about 30 parts by weight, the resulting coating film possesses suitable tack properties but suffers deficient adhesion properties; on the other hand, if the nitrile-containing monomer is present in an amount less than about 15 parts by weight, the resulting coated film possesses deficient plasticizer migration resistance. The presence of carboxylic acid units in the polymer latex composition affords a coated film having deficient adhesion and solvent resistance properties. While the use of various known crosslinking monomers provides coated films having the advantageous combination or balance of properties provided by the present invention, their use involves higher cost with regards to monomers and disadvantageous higher energy cure conditions.

The following specific combinations of monomers represent but a few of those contemplated within the scope of the invention:
BA/S/AN: (30/50/20)
BA/S/AN: (40/40/20)
BA/S/AN: (50/30/20)
BA/IPMA/AN: (20/50/30)
BA/S/AN: (35/40/25)
BA/S/AN: (30/40/30)
BA/S/AN: (20/40/40)
BA/IBMA/AN: (10/60/30)
BMA/AN: (75/25)

Blends of the aqueous emulsion addition copolymers may, of course, be used to provide an average composition within the overall limits defined herein.

The copolymer is preferably made by the emulsion copolymerization of the several monomers in the proper proportions. Thus, the monomers may be emulsified with an anionic, a cationic, or a nonionic dispersing agent, about 0.5% to about 6%, preferably 1 to 6%, thereof being used on the weight of total monomers. A polymerization initiator of the free radical type, such as ammonium or potassium persulfate, may be used alone or in conjunction with an accelerator, such as potassium metabisulfite, or sodium thiosulfate. The initiator and accelerator, commonly referred to as catalysts, may be used in proportions of 0.5 to 2% each based on the weight of monomers to be copolymerized. The temperature may be from room temperature to 60° C. or more as is conventional. Suitable anionic dispersing agents include the sodium salts of the higher fatty acid sulfates such as that of lauryl alcohol, the higher fatty acid salts such as the oleates or stearate of morpholine, triethanolamine or mixed ethanol amines, or any of the nonionic types such as ethylene oxide modified alkyl phenols of which t-octyl phenol modified by 20 to 40 ethylene oxide units is representative, ethylene oxidemodified higher fatty alcohols such as lauryl alcohol also containing 20 to 50 ethylene oxide units, similarly modified long chain mercaptans, fatty acids, amines, or the like.

The compositions are adapted to form clear glossy coatings. However, if desired, a translucent appearance or an opaque or colored appearance may be obtained by the introduction of dulling agents, water-soluble or oil-soluble dyes, pigments or fillers in suitable proportions. Examples of suitble water-insoluble pigments which may be used include titanium dioxide, carbon black, iron blues, phthalocyanine blues and greens; metal oxides, hydroxides, sulfides, sulfates, silicates, and chromates; organic maroons, aluminum flake, bronze powders, pearle essence, and various fillers or extenders such as talc, borytes, china clay, and diatomaceous earth.

The amount of pigment may be varied widely, depending on the effect desired. The amount of pigment, by weight based on the weight of the organic film-forming material, may vary between about 2% for light, high-hiding pigments such as carbon black and about 100% for heavy, low-hiding pigments such as lead chromate.

The polymeric latex composition may contain a coalescent and/or plasticizer whenever it is necessary in a particular application to provide a lower temperature of film formation from the aqueous emulsion addition polymer dispersions. From about 10 to 45%, preferably 15 to 30%, by weight of the coalescent and/or plasticizer, based on the weight of the polymer latex, is quite practical.

Since the purpose of the coalescent and/or plasticizer is usually to facilitate film formation, a coalescent, especially a fugative (that is, volatile) coalescent, is preferred rather than a permanent plasticizer. However, permanent plasticizers may advantageously be used. For exampler, certain plasticizers, such as tributoxyethyl phosphate, serve also as leveling agents.

Examples of fugitive coalescents and/or plasticizers include the monoethyl or monomethyl ether of diethylene glycol, isophorone, benzyl alcohol, and 3-methoxybutanol-1; diisobutyl ketone; and butyl cellosolve acetate. Examples of essentially permanent plasticizers that may be used are benzyl butyl phthalate, dibutyl phthalate, dioctyl phthalate, triphenyl phosphate, 2-ethylhexyl benzylphthalate, butyl cyclohexyl phthalate, mixed benzoic acid and fatty acid esters of pentaerythritol, poly(propylene adipate)dibenzoate, diethylene glycol dibenzoate, tetrabutylthiodiscucinate butyl phthalyl butyl glycolate, acetyl tributyl citrate, dibenzyl sebacate, tricresyl phosphate, toluene ethyl sulfonamide, the di-2-ethylhexyl ester of hexamethylene glycol diphthalate, di(methylcyclohexyl)phthalate, tributoxyethyl phosphate, tributyl phosphate. The particular coalescent and/or plasticizer and the amount thereof used are chosen in accordance with the demand for compatibility and efficiency in lowering the film forming temperature.

It is understood herein that the term "coalescent" means a compound, or mixture of compounds, which when present with the polymeric latex composition in a coating composition permits the formation of a film at a lower temperature than in the absence of the coalescent compound. On the other hand, the term "plasticizer" means a compound or mixture of compounds which, when present with the polymeric latex composition in coating compositions, provides a film product that is softer than the film prepared in the absence of the plasticizer compound. Rheology modifying compounds or compositions may also be included in the polymeric latex composition used in the invention. For example, there may be included in the polymeric latex compositions used in the invention the non-ionic thickeners disclosed in U.S. Pat. No. 4,079,028 and references cited therein. Examples of other rheology modifying compounds will be readily apparent to those skilled in the art.

The vinyl film substrate used in the invention may be any member of the well-known variety of such films produced from about 85 to 100 parts by weight of vinyl chloride and from 0 to about 15 parts by weight of at least one member selected from the group consisting of vinylidene chloride, vinyl acetate, alkyl acrylates, alkyl methacrylates, styrene, acrylonitrile, alpha-olefins and diene monomers. The term "vinyl film substrate" is used herein to mean those vinyl films produced from at least a predominant amount, if not the entire amount, of vinyl chloride and such a relatively high amount of plasticizer and stabilizer as would render the product film sufficiently soft and flexible and resistant to degradation to permit its use in producing the coated products of the invention and is intended to distinguish the vinyl films used as substrates in the present invention from less highly plasticized and stabilized and less flexible vinyl materials intended to be more readily adaptable for use as vinyl floor tile materials. The vinyl film substrate is generally produced from a formulation of ingredients including a predominant amount of polyvinyl chloride, plasticizers such as those of the well known phthalate ester, castor oil and soy oil, and polyester types which provide flexibility to the polyvinyl chloride film substrate; stabilizers such as the group of metallic salts including zinc and cadmium stearate or maleate which prevent or retard the degradation of polyvinyl chloride; and, optionally, any of the pigments or fillers or other additional components mentioned above as being useful with the polymeric latex composition to form the coating film.

Although the polymeric latex composition may be applied to the vinyl film substrate by any suitable means, the polymeric latex composition is conveniently, spread onto the vinyl film substrate in a predetermined amount, under industrial conditions, using the well-known gravure printing process techniques or under laboratory conditions, using a wire wound rod. The coated vinyl film substrate is then dried in a hot air oven maintained at about 170° F. to about 220° F. for about 0.5–5 min.

The following examples, in which parts and percentages are by weight unless otherwise indicated, are illustrative of but a few representative embodiments of the invention. The temperatures are in degrees Celsius unless otherwise expressly noted. The following abbreviations are used:
AA=acrylic acid
ABB=allyl o-benzoylbenzoate
AMBB=allyl 2-(4'-methyl)benzoylbenzoate
AN=acrylonitrile
BA=butyl acrylate
BMA=butyl methacrylate
EA=ethyl acrylate
2-EHA=2-ethylhexyl acrylate
IA=itaconic acid
IBMA=isobutyl methacrylate
MAA=methacrylic acid
MMA=methyl methacrylate
MOA=55:45 molar mixture of N-methylolacrylamide and acrylamide
St=Styrene
$T_g$=glass transition temperature
Crosslinker Y=3-Chloro-2-hydroxypropyl dimethyl methacryloxyethyl ammonium chloride activated by treatment with aqueous $NaHCO_3$.

EXAMPLE 1

Preparation of Copolymer of BA/S/AN (30/50/20)

This example illustrates the preparation of a polymer latex composition as defined within the limitations of the present invention.

A monomer emulsion is prepared by mixing the following ingredients: 61.4 parts of a 70% solution of octylphenoxypolyethoxyethanol (EO-40) in water, 630 parts deionized water, 780.6 parts of styrene, 468.36 parts butyl acrylate and 312.24 parts acrylonitrile.

To a 5-liter flask is charged 27.4 parts of a 70% solution of octylphenoxypolyethoxyethanol (EO-40) and water, 2,000 parts of deionized water, 384 parts of the monomer emulsion described above and 0.17 parts glacial acetic acid. The flask is swept with a nitrogen stream and the contents are stirred. To this flask held at a temperature of 20°–25° C. is added a polymerization initiator system of 17.4 ml of a 0.15% solution of $FeSO_4.7H_2O$ in water, 1.04 part t-butyl hydroperoxide (70% active ingredient in aqueous solution) in 6 ml of water and 0.63 parts sodium formaldehyde sulfoxylate. Polymerization of the monomers begins within a few minutes following the addition of the initiator system and the temperature increases to about 50° C. in about 20 minutes. About 5 minutes following the reaching of this exotherm, there is charged to the reaction flask the remainder of the monomer emulsion to which has been added an additional 45 parts of the octylphenoxypolyethoxyethanol (EO-40) in 50 parts of water. The addition of the remainder of the monomer emulsion is a gradual addition. Upon completion of the polymerization reaction, the resulting batch is cooled to about 40 C. and filtered through cheesecloth. The properties of the resulting polymer emulsion are as follows: Solids 41.5%, conversion 98.8%, pH 6.9, viscosity 34 cps. (Brookfield Viscometer, Spindle No. 2 at 60 rpm). Following substantially the procedure described in Example 1 except for the proportions of the respective monomers, examples 2–17 are prepared. Examples 2–7 represent additional polymeric latex compositions within the scope of the invention as broadly defined above whereas Examples 8–18 represent polymeric latex compositions outside of the invention as broadly defined above and are set forth for purposes of comparison. Examples 1 and 2 represent two most preferred embodiments of the invention. Examples 3–5 represent more preferred embodiments of the invention. Examples 6 and 7 represent embodiments within the broadest scope of the invention defined herein.

EXAMPLE 2

BA/S/AN (40/40/20).

EXAMPLE 3

BA/S/AN (50/30/20).

EXAMPLE 4

BA/IBMA/AN (20/50/30).

EXAMPLE 5

BA/S/AN (35/40/25).

EXAMPLE 6

BA/S/AN (30/40/30).

EXAMPLE 7

BA/S/AN (20/40/40).

EXAMPLE 8

BA/S/MMA (30/50/20).

EXAMPLE 9

S/AN (40/60).

EXAMPLE 10

EA/S/AN (50/30/20).

EXAMPLE 11

BA/S/AN/Crosslinker Y (27/50/20/3).

EXAMPLE 12

BA/S/AN/MOA (27/5/20/3).

EXAMPLE 13

BA/S/AN/ABB (30/45/20/5).

EXAMPLE 14

BA/S/AN/AMBB (30/45/20/5).

EXAMPLE 15

BA/S/AN/IA (49/30/20/1).

EXAMPLE 16

BA/S/AN/MAA (48/34/15/3).

EXAMPLE 17

2-EHA/S/AN/MAA (30/40/25/5).

EXAMPLE 18

BA/S/AN/MAA (49/30/20/1).

In order to evaluate the polymeric latex compositions of Examples 1–17, the polymeric latex compositions are formulated as follows: about 69 parts by weight of each of the polymeric latex compositions containing about 40% polymer solids, independently, is mixed with about 20 parts by weight of, tributoxyethylphosphate, about 19 parts by weight of additional water, about 2 parts by weight of an aqueous solution containing about 25% by weight of at least one of, or a mixture of, octylphenoxypolyethoxyethanol (EO-8) and $C_8F_{17}SO_2$—$N(C_2H_5)CH_2COOK$, about 2 parts by weight of the nonionic thickener Acrysol® TT-678 available from Rohm and Haas Company, and about 6 parts by weight of an aqueous mixture of about equal portions of diisobutylketone and butylcellosolve acetate with small amounts of butanol and additional dispersants added.

Coatings of the polymeric latex compositions of Examples 1–17 formulated as described above are applied to a stock vinyl film substrate suitable for use as a wall covering using a #20 wire wound rod and each of the coated vinyl film substrate samples is dried in an air oven maintained at about 180° F. for about 1 min.

Solvent resistance, exemplified by resistance to isopropanol and to "409 Cleaner" (Chlorox Company), is measured in an $A^2TC^2$ crock meter according to a modification of the $A^2TC^2$ Test Method 116-1969, "Colorfastness to Crocking: Rotary Vertical Crock Meter Method" set forth in the AATCC (American Association of Technical Chemists and Colorists Technical Manual 1971, Vol. 47, page 115. The modification referred to above lies in the adaptation to topcoated vinyl substrates of the method set forth for textile samples.

Block resistance, which is also taken as an indicator of adhesion, is measured by the Fisher Body Company Blocking Test Method 31-6, revised July 8, 1970 by means of juxtaposing the polymeric latex composition-coated surfaces of two coated vinyl film substrates. These samples are held in juxtaposition as described above under a pressure of 0.5 psi at 175° F. for 30 minutes.

Relative plasticizer migration resistance is measured using a Zapon tack tester according to the procedure well-known in the art. In this test, coated vinyl film substrate samples are exposed at 140° F. for varying time periods. Time to Zapon failure is taken to evaluate the relative plasticizer migration resistance.

The results of the tests described above are set forth in TABLE I below.

TABLE I

Performance of Dried Aqueous Topcoat Films On "Wall-Covering" Vinyl Substrates

| Polymer Latex Composition (Ex.) | Performance Test[a] | | | | |
|---|---|---|---|---|---|
| | Solvent Resistance | | | | Plasticizer |
| | Iso-propanol | "409" Cleaner | Block Resistance | Adhesion | Migration Resistance |
| 1 | E | E | E | E | F |
| 2 | E | E | E | E | F |
| 3 | F | F | E | F | F |
| 4 | F | E | E | E | F |
| 5 | E | E | U | U | F |
| 6 | E | E | U | U | E |
| 7 | U | E | U | U | E |
| 8 | F | E | U | U | U |
| 9 | E | E | U | U | U |
| 10 | F | F | U | U | F |
| 11 | E | E | E | E | F |
| 12 | U | U | U | U | F |
| 12[b] | E | E | E | E | E |
| 13 | E | E | E | U | F |
| 13[c] | E | E | E | E | E |
| 14 | E | E | E | U | E |
| 14[c] | E | E | E | E | E |
| 15 | U | F | F | F | U |
| 16 | F | F | F | F | F |
| 17 | F | U | F | U | F |
| 18 | U | F | F | F | U |

[a]E = Excellent; F = Fair; U = Unsatisfactory
[b]Polymer latex composition cured by exposing coated vinyl film to 300° F. for 3–5 min.
[c]Polymer latex composition cured by passing the coated vinyl film under 200 Watt/in. medium pressure mercury lamp at 15 ft/min.

The results set forth in TABLE I demonstrate that coated vinyl film obtained according to the most preferred embodiment of the invention, Examples 1 and 2, possess a most satisfactory balance of performance properties comparable to those obtained using known crosslinking agents in the coating film, namely Examples 10, 11[b], 12[c], and 13[c]. Of the coated vinyl film obtained according to the more preferred embodiment of the invention, Examples 3 and 4 display a satisfactory balance of properties required of such film although Example 5, also according to the more preferred embodiment of the invention displays properties which are marginal. The coated vinyl film obtained by Examples 6 and 7 display a balance of required performance properties which is only marginal at best. The balance of properties of comparative coated vinyl films of Examples 8, 9, and 15–18 is generally unsatisfactory.

What is claimed is:

1. A process for making coated vinyl film by treating and preserving a vinyl film substrate, having a thickness of from 1 mil to 200 mils and being produced from a monomer mixture containing a total of 100 parts by weight comprising from about 85 to 100 parts by weight of vinyl chloride and from 0 to about 15 parts by weight of at least one member selected from the group consisting of vinylidene chloride, vinyl acetate, alkyl acrylates, alkyl methacrylates, styrene, acrylonitrile, alphaolefins and diene monomers, which comprises applying to the vinyl film substrate a coating film and then drying the coated vinyl film substrate under mild conditions of about 170° to 300° F. for about 0.05 min. to about 5 min. or more as required by the thickness of the coating film applied and by the solids content therein to obtain a dried film having a thickness of from about 0.05 mil to about 1 mil, wherein the coating film comprises a polymeric latex composition, having a polymer solids content of about 25% to about 60% by weight and comprises an aqueous emulsion addition polymer polymerized from a monomer mixture consisting essentially of
   (a) about 10 to 80 parts by weight, based on total monomer mixture, of at least one member selected from the group consisting of (i) $C_4$–$C_8$ alkyl acrylates, (ii) a member of the group of vinyl aromatic monomers consisting of styrene, vinyl toluene, and alpha-methyl styrene, and (iii) $C_4$–$C_8$ alkyl methacrylates,
   (b) about 15 to 30 parts by weight, based on total monomer mixture, of at least one nitrile-containing monomer selected from the group consisting of acrylonitrile and methacrylonitrile, and
   (c) 0 to about 25 parts by weight, based on total monomer mixture, of at least one member selected from the group consisting of $C_1$–$C_3$ and $C_9$–$C_{18}$ alkyl methacrylates, $C_1$–$C_3$ and $C_9$–$C_{18}$ alkyl acrylates, vinyl chloride, vinylidene chloride, vinyl acetate, alphaolefins, vinylidene chloride, vinyl acetate, alpha-olefins and diene monomers,
the monomers being selected to provide a coating film formed therefrom having a $T_g$ of from about 20° C. to about 85° C. and the ratio of (a):(b) being from about 4:1 to about 3:2.

2. The process of claim 1 wherein the polymeric latex composition comprises an aqueous emulsion addition polymer polymerized from a monomer mixture consisting essentially of
   (a) about 10 to 50 parts by weight, based on total monomer mixture, of at least one $C_4$–$C_8$ alkyl acrylate,
   (b) about 30 to 70 parts by weight, based on total monomer mixture, of at least one member selected from the group consisting of (i) a member of the group of vinyl aromatic monomers consisting of styrene, vinyl toluene, and alpha-methyl styrene and (ii) $C_4$–$C_8$ alkyl methacrylates,
   (c) about 15 to 30 parts by weight, based on total monomer mixture, of at least one nitrile-containing monomer selected from the group consisting of acrylonitrile and methacrylonitrile and
   (d) 0 to about 25 parts by weight, based on total monomer mixture, of at least one member selected from the group consisting of $C_1$–$C_3$ and $C_9$–$C_{18}$ alkyl methacrylates, $C_1$–$C_3$ and $C_9$–$C_{18}$ alkyl acrylates, vinyl chloride, vinylidene chloride, vinyl acetate, alpha-olefins and diene monomers,
the monomers being selected to provide a coating film formed therefrom having a $T_g$ of from about 20° C. to about 85° C. and the ratio of (b):(c) being from about 3:1 to 3:2 as the amount of (a) varies.

3. The process of claim 2 wherein the polymeric latex composition comprises an aqueous emulsion addition polymer polymerized from a monomer mixture consisting essentially of
   (a) about 20 to 50 parts by weight, based on total monomer mixture, of at least one $C_4$–$C_8$ alkyl acrylate,
   (b) about 30 to 50 parts by weight, based on total monomer mixture, of at least one member selected from the group consisting of (i) a member of the group of vinyl aromatic monomers consisting of styrene, vinyl toluene, and alpha-methyl styrene and (ii) $C_4$–$C_8$ alkyl methacrylates,
   (c) about 15–30 parts by weight, based on total monomer mixture, of at least one nitrile-containing monomer selected from the group consisting of acrylonitrile and methacrylonitrile, and
   (d) 0 to 15 parts by weight, based on total monomer mixture, of at least one member selected from the group consisting of $C_1$–$C_3$ and $C_9$–$C_{18}$ alkyl methacrylates, $C_1$–$C_3$ and $C_9$–$C_{18}$ alkyl acrylates, vinyl chloride, vinylidene chloride, vinyl acetate, alpha-olefins and diene monomers,
the monomers being selected to provide a coating film formed therefrom having a $T_g$ of from about 20° C. to about 85° C. and the ratio of (b):(c) being from about 5:2 to 3:2 as the amount of (a) varies.

4. The process of claim 3 wherein the coated vinyl film substrate is dried under mild conditions of about 180° F. to about 220° F. for about 0.05 min. to about 5 min. and wherein the polymeric latex composition comprises an aqueous emulsion addition polymer polymerized from a monomer mixture consisting essentially of
   (a) about 20 to 50 parts by weight, based on total monomer mixture, of at least one $C_4$–$C_8$ alkyl acrylate,
   (b) about 30 to 50 parts by weight, based on total monomer mixture, of at least one member selected from the group consisting of (i) a member of the group of vinyl aromatic monomers consisting of styrene, vinyl toluene, and alpha-methyl styrene and (ii) $C_4$–$C_8$ alkyl methacrylates, and
   (c) about 15 to 30 parts by weight, based on total monomer mixture, of at least one nitrile-containing monomer selected from the group consisting of acrylonitrile and methacrylonitrile,
the monomers being selected to provide a coating film formed therefrom having a $T_g$ of from about 50° C. to about 75° C. and the ratio of (b):(c) being from about 5:2 to 3:2 as the monomer of (a) varies.

5. The process of claim 4 wherein the polymeric latex composition comprises an aqueous emulsion addition polymer polymerized from a monomer mixture consisting essentially of
   (a) about 30 to 50 parts by weight based on total monomer mixture, of at least one $C_4$–$C_8$ alkyl acrylate,
   (b) about 30 to 50 parts by weight, based on total monomer mixture, of at least one vinyl aromatic monomer selected from the group consisting of styrene, vinyl toluene, and alpha-methyl styrene, and (c) about 15 up to about 30 parts by weight, based on total monomer mixture, of at least one nitrile-containing monomer selected from the group consisting of acrylonitrile and methacrylonitrile, the monomers being selected to provide a coating film formed therefrom having a $T_g$ of from about 50° C. to about 75° C. and the ratio of (b):(c) being from about 5:2 to 2:1 as the amount of (a) varies.

6. The process of claim 1 wherein the polymeric latex composition comprises an aqueous emulsion addition polymer polymerized from a monomer mixture consisting essentially of
   (a) about 75 parts by weight, based on total monomer mixture, of butyl methacrylate, and
   (b) about 25 parts by weight, based on total monomer mixture, of acrylonitrile.

7. The process of claim 4 wherein the polymeric latex composition comprises an aqueous emulsion addition polymer polymerized from a monomer mixture consisting essentially of
   (a) about 20 parts by weight of butyl acrylate,
   (b) about 50 parts by weight of isobutyl methacrylate, and
   (c) about 30 parts by weight of acrylonitrile.

8. The process of claim 5 wherein the polymeric latex composition comprises an aqueous emulsion addition polymer polymerized from a monomer mixture consisting essentially of
   (a) about 30 to 50 parts by weight of butyl acrylate,
   (b) about 30 to 50 parts by weight of styrene, and
   (c) from about 15 up to about 30 parts by weight of acrylonitrile, the ratio of the amount of styrene to acrylonitrile being maintained in the range of from about 5:2 to about 2:1 as the amount of butyl acrylate varies.

9. The process of claim 8 wherein the polymeric latex composition comprises an aqueous emulsion addition polymer polymerized from a monomer mixture consisting essentially of
   (a) 30 parts by weight of butyl acrylate,
   (b) 50 parts by weight of styrene, and
   (c) 20 parts by weight of acrylonitrile.

10. The process of claims 1 or 4 or 5 wherein the polymeric latex composition comprises an aqueous emulsion polymer further containing at least one member selected from the group consisting of dispersants, pigments, fillers, opacifying agents, leveling agents, thickening agents, rheology modifying agents, coalescents and plasticizers, the total solids in the resulting aqueous composition being from about 25 to about 50% by weight.

11. An article of manufacture consisting essentially of
   (a) a vinyl film substrate, having a thickness of 1 mil to 200 mils and being produced from a monomer mixture containing a total of 100 parts by weight comprising from about 85 to 100 parts by weight of vinyl chloride and from 0 to about 15 parts by weight of at least one member selected from the group consisting of vinylidene chloride, vinyl acetate, alkyl acrylates, alkyl methacrylates, styrene, acrylonitrile, alpha-olefins, and diene monomers, having adhered to at least one surface thereof
   (b) a dried coating film having a thickness of about 0.05 mil to about 1 mil comprising the dried product of a polymeric latex composition comprising an aqueous emulsion addition polymer polymerized from a monomer mixture consisting essentially of
      (1) about 10 to 80 parts by weight, based on total monomer mixture, of at least one member selected from the group consisting of (i) $C_4$–$C_8$ alkyl acrylates, (ii) a member of the group consisting of vinyl aromatic monomers consisting of styrene, vinyl toluene, and alpha-methyl styrene, and (iii) $C_4$–$C_8$ alkyl methacrylates,
      (2) about 15 to 30 parts by weight, based on total monomer mixture, of at least one nitrile-containing monomer the monomers being selected to provide a coating film formed therefrom having a $T_g$ of from about 20° C. to about 85° C. and the ratio of (a):(b) being from about 4:1 to about 3:2.

12. The article of claim 11 wherein the dried coating film comprises the dried product of a polymeric latex composition comprising an aqueous emulsion addition polymer polymerized from a monomer mixture consisting essentially of
   (a) about 20 to 50 parts by weight, based on total monomer mixture, of at least one $C_4$–$C_8$ alkyl acrylate,
   (b) about 30 to 50 parts by weight, based on total monomer mixture, of at least one member selected from the group consisting of a member of the group of vinyl aromatic monomers consisting of styrene, vinyl toluene, and alpha-methyl styrene and (ii) $C_4$–$C_8$ alkyl methacrylates, and
   (c) about 15 to 30 parts by weight, based on total monomer mixture of at least one nitrile-containing monomer selected from the group consisting of acrylonitrile and methacrylonitrile, the monomers being selected to provide a coating film formed therefrom having a $T_g$ of from about 50° C. to about 75° C. and the ratio of (b):(c) being from about 5:2 to 3:2 as the amount of (a) varies.

13. The article of claim 12 wherein the dried coating film comprises the dried product of a polymeric latex composition comprising an aqueous emulsion addition polymer polymerized from a monomer mixture consisting essentially of
   (a) about 20 parts by weight of butyl acrylate,
   (b) about 50 parts by weight of isobutyl methacrylate, and
   (c) about 30 parts by weight of acrylonitrile.

14. The article of claim 12 wherein the dried coating film comprises the dried product of a polymeric latex composition comprising an aqueous emulsion addition polymer polymerized from a monomer mixture consisting essentially of
   (a) about 30 to 50 parts by weight, based on total monomer mixture, of at least one $C_4$–$C_8$ alkyl acrylate,
   (b) about 30 to 50 parts by weight, based on total monomer mixture, of at least one vinyl aromatic monomer selected from the group consisting of styrene, vinyl toluene, and alpha-methyl styrene, and
   (c) about 15 to 30 parts by weight, based on total monomer mixture, of at least one nitrile-containing monomer selected from the group consisting of acrylonitrile and methacrylonitrile, the monomers being selected to provide a coating film formed therefrom having a $T_g$ of from about 50° C. to about 75° C. and the ratio of (b):(c) being from about 5:2 to 2:1 as the amount of (a) varies.

15. The article of claim 14 wherein the dried coating film comprises the dried product of a polymeric latex composition comprising an aqueous emulsion addition polymer polymerized from a monomer mixture consisting essentially of
(a) about 30 to 50 parts by weight of butyl acrylate,
(b) about 30 to 50 parts by weight of styrene, and
(c) about 15 to about 30 parts by weight of acrylonitrile the ratio of the amount of styrene to acrylonitrile being maintained in the range of from about 5:2 to 2:1 as the amount of butyl acrylate varies.

16. The article of claims 11 or 12 or 14 wherein the polymeric latex composition comprising the aqueous emulsion addition polymer further contains at least one member selected from the group consisting of dispersants, pigments, fillers, opacifying agents, leveling agents, thickening agents, rheology modifying agents, coalescents and plasticizers.

17. The article of claim 11 in the form of an upholstery material.

18. The article of claim 12 in the form of an upholstery material.

19. The article of claim 13 in the form of an upholstery material.

20. The article of claim 14 in the form of an upholstery material.

21. The article of claim 15 in the form of an upholstery material.

22. The article of claim 16 in the form of an upholstery material.

* * * * *